United States Patent
Pennartz

(10) Patent No.: US 8,080,186 B1
(45) Date of Patent: Dec. 20, 2011

(54) FIRE MITIGATION AND MODERATING AGENTS

(76) Inventor: Edmund R. J. Pennartz, Canoga Park, CA (US)

( * ) Notice: Subject to any disclaimer, the term of this patent is extended or adjusted under 35 U.S.C. 154(b) by 0 days.

(21) Appl. No.: 12/947,566

(22) Filed: Nov. 16, 2010

(51) Int. Cl.
- *A62D 1/00* (2006.01)
- *C09K 21/04* (2006.01)
- *C09K 21/06* (2006.01)
- *C09K 21/08* (2006.01)

(52) U.S. Cl. ............. 252/601; 252/2; 252/603; 252/606; 252/607

(58) Field of Classification Search ............... 252/2, 601, 252/603, 606, 607
See application file for complete search history.

(56) References Cited

U.S. PATENT DOCUMENTS

| | | |
|---|---|---|
| 4,950,410 A | 8/1990 | Pennartz |
| 4,961,865 A | 10/1990 | Pennartz |
| 5,091,097 A | 2/1992 | Pennartz |

FOREIGN PATENT DOCUMENTS

WO    WO 8800482 A1    1/1988

*Primary Examiner* — Peter F Godenschwager
(74) *Attorney, Agent, or Firm* — Marc Martino

(57) ABSTRACT

The fire mitigation and moderating agent includes by weight one percent (1%) to five percent (5%) potassium hydroxide, two percent (2%) to seven percent (7%) citric acid, four percent (4%) to thirty six percent (36%) diammonium phosphate, four percent (4%) to twenty percent (20%) carbamide, and point five percent (0.5%) to four percent (4%) surface tension reducing component which comprises by weight twenty percent (20%) to fifty five percent (55%) octyldimethylamine oxide, fifteen percent (15%) to thirty five percent (35%) modified polyether organosiloxane, five percent (5%) to twenty percent (20%) sugar based surfactant, three percent (3%) to twelve percent (12%) 1,4-Bis(ethylhexyl)sodium sulfosuccinate, point zero one percent (0.01%) to point one percent (0.1%) anionic phosphate fluorosurfactant, and point one percent (0.1%) to two point five percent (2.5%) polymer adhesive mixture. The polymer adhesive mixture comprises seventy percent (70%) water and thirty percent (30%) polymer adhesive.

20 Claims, No Drawings

FIRE MITIGATION AND MODERATING AGENTS

FIELD OF THE INVENTION

The present invention generally relates to fire mitigation and moderating agents. More particularly, the present invention relates to an aqueous solution for mitigating and moderating combustible (extremely dry) landscape vegetation, in particular dry grasses and brushes, common in semi-arid regions.

BACKGROUND OF THE INVENTION

Three elements are required for a fire to exist and flourish; fuel, heat, and oxygen. Fuel is something that will burn in the presence of heat. When combined with oxygen, the fire thereby releases more heat and, as a result, reduces itself to other chemical compounds. Heat can be considered the catalyst that accelerates the combining of oxygen with fuel, which in turn, releases more heat. The action of oxygen combining chemically with other substances through the process of oxidation accompanied by a noticeable release of heat and light, is called combustion or burning. Remove any one of these necessary elements and the fire goes out.

The National Fire Protection Association has classified fires into three basic types; Class A, Class B, and Class C fires. Class A fires include all ordinary combustible materials such as wood, cloth, paper, upholstery materials, etc. Class B fires include all flammable petroleum products or other flammable or combustible liquids, greases, solvents, paints, etc. Class C fires include energized electrical equipment. There are various forms of extinguishing media suitable for each class of fire. In Class C fires the electrical non conductivity of the extinguishing media is of importance. In most cases, where electrical equipment involved in a Class C fire is de-energized, extinguishers suitable for use on Class A or B fires may be employed effectively.

A fourth class of fire, Class D fire, is defined as fire in flammable metal. Class D fires are not considered a basic type of fire since they are generally caused by a Class A, B or C fire. Usually, Class D fires involve magnesium.

It is known that each combustible material, whether it be a solid, liquid, or gas, has a flame or self-ignition point. When the combustible material is maintained at a temperature below this flame point, it will not burn. Thereby, most prior art methods for extinguishing fires attempt to cool the burning material below the flame point. Class A fires respond best to water or water-type extinguishers that cool the fuel below combustion temperatures. Class B and Class C extinguishers are also effective, but are not equal to the wetting/cooling action of a class A extinguisher.

Class B fires respond to carbon dioxide ($CO_2$), halogenated hydrocarbons (halons) and dry chemicals, all of which displace the oxygen in the air and thereby make combustion impossible. Foam is effective, especially when used in large quantities. Water is ineffective on Class B fires because of the immiscibility of oil and water and may even cause the fire to spread.

Class C fires involving electrical wiring and equipment respond best to $CO_2$, which displaces the oxygen in the atmosphere, making combustion difficult. Dry chemicals are also effective on Class C fires but have the disadvantage of contaminating the local area with powder. Also, if used on wet and energized electrical equipment, dry chemicals may aggravate electrical current leakage. Water or foam are not acceptable agents for use on electrical equipment fires.

Class D fires respond to the application of dry powder, which prevents oxidation and the resulting flame. The application of water on a metal fire is to be avoided because it will cause the fire to burn more violently and can cause explosions.

The most common fire fighting agents are thus water and water-based agents, dry chemicals, and gas. Water and water-based agents are typically used on carbonaceous fires. Water extinguishes a fire by cooling the fuel below the flame point or combustion temperature. The disadvantage of water and water-based agents is that water is not effective on all combustible materials. In addition, large quantities of water are not always available. While dry chemicals offer the advantage of being nonconductors of electricity, they tend to be environmentally unfriendly and hazardous to fire fighters. Gases such as carbon dioxide and halons are toxic and, thus, environmentally unfriendly.

Extinguishing Class B liquid fires presents unique difficulties to fire fighters. With respect to pools of burning liquid, combustion takes place adjacent to the surface of the liquid due to evaporation of the liquid into the air. While foam has been used in the past to smother the flame on liquid fires, it has the disadvantage of requiring substantial amounts of foam material to completely extinguish the fire. Another method gaining rapid commercial acceptance utilizes a chemical that causes a film and foam layer on top of the liquid pool to interrupt evaporation. This chemical is commonly known as aqueous film-forming foam (AFFF). The disadvantages of AFFF are that it requires a special nozzle to apply the agent, the agent takes a substantial amount of time to build a foam layer sufficiently thick to extinguish the flames, and it does not lower the temperature of the liquid pool, presenting the danger of reignition when the liquid fuel is agitated. Self-propelled, three-dimensional liquid fires, such as oil and gas wellhead fires, are not extinguishable using foam because the liquid is expelled into the air at a high rate from the wellhead, with the residue forming burning liquid pools on the ground. This type of fire is extremely hot and requires very large amounts of fire fighting agent to permanently extinguish the fire. One method for extinguishing oil and gas wellhead fires uses an explosive charge that is detonated immediately above the wellhead to force the flame front away from the wellhead area. This temporarily creates a vacuum that deprives the fire of oxygen. If the liquid fuel is not immediately doused and cooled with a fire fighting agent, the returning air rushing in to fill the vacuum can cause the hot liquid fuel to reignite. This particular method is extremely dangerous and also requires substantial amounts of fire fighting agent.

Fighting wildfires also has its difficulties, due to uncontrollable winds which can easily spread a fire and due to the potentially large amount of dry and combustible vegetation. Currently, one of the common fire fighting products used today is Phos-Chek. Phos-Chek fire retardants are manufactured as dry powders or as concentrated liquids and diluted with water prior to use. The retardant is applied directly to or ahead of wildfires and to homes and vegetation by ground crews and aerial firefighting units, using either fixed-wing or rotary-wing aircraft. It is a very common site to watch on the television news reports of the various colored Phos-chek mixtures being selectively dropped upon various fires and other targeted areas.

Phos-chek is currently produced in several colors, including an off-white color, a red iron oxide, and a fugitive mixture that is colored red when dispersed but gradually fades to an earth-tone when exposed to sunlight. The red color aids aircrews in targeting drops of retardant.

Some of the main components of Phos-Chek retardants include ammonium polyphosphate, diammonium phosphate, diammonium sulfate, monoammonium phosphate, attapulgus clay, guar gum (or a derivative of guar gum), and various trade secret performance additives. Fire retardants are manufactured as several different formulations with varying proportions of the above components. The phosphate and sulfate salts act as fire retardants and prevent combustion of cellulosic materials. Guar gum and clay are thickening agents to prevent dispersal of the retardant after it is dropped from the plane. Other ingredients include corrosion inhibitors and flow conditioners such as Silica. Phos-Chek WD-881 is mixture of anionic surfactants, foam stabilizers, and solvents including hexylene glycol. As fire-fighting foam, it is used as a class B short-term fire suppressant.

Unfortunately, Phos-chek has major drawbacks. It is only a short-term fire suppressant and is not applied well before a fire starts. The effectiveness of Phos-chek quickly deteriorates over time and cannot be used in a purely preventative measure before a fire is even anticipated. Phos-chek also stains the ground and surfaces it is placed upon. Phos-chek also when dry becomes the consistency of concrete and is extremely difficult to clean thereafter. Finally, Phos-chek when mixed with water can not be stored for short or prolonged periods and must be used or discarded immediately. Accordingly, it is not used by residents who want to take proactive steps to protect their residences even before a fire has started.

As can be seen, fighting fires correctly is extremely difficult. It is therefore desired that the fire never starts in the first place. Accordingly, there is a need for a fire suppression mixture that can be applied as a preventative measure to prevent a fire from occurring. Furthermore, there is a need for this mixture to be clear and free from color staining the surfaces it is applied to. Additionally, it would be desirous for the mixture to be environmental friendly and simply breakdown chemically and wash away the next time it rains. The present invention fulfills these needs and provides other related advantages.

SUMMARY OF THE INVENTION

An exemplary embodiment of the fire mitigation and moderating agent of the present invention includes a strong base, from one to five percent (1-5%) by weight; a weak acid, from two to seven percent (2-7%) by weight; a water soluble ammonium phosphate salt, from four to thirty-six percent (4-36%) by weight; an active hydrogen containing nitrogenous organic compound, from four to twenty percent (4-20%) by weight; and a surface tension reducing component, from point five to four percent (0.5-4%) by weight.

The strong base comprises potassium hydroxide and the weak acid comprises citric acid. The water soluble ammonium phosphate salt comprises diammonium phosphate. The hydrogen containing nitrogenous organic compound comprises carbamide.

The surface tension reducing component comprises: a binder agent, from twenty to fifty-five percent (20-55%) by weight; a surface tension reducer, from point zero one to thirty-five point one percent (0.01-5.1%) by weight; an adhesion increaser, from five to twenty percent (5-20%) by weight; an anionic surfactant, from three to twelve percent (3-12%) by weight; and a polymer adhesive mixture, from point one to two point five percent (0.1-2.5%) by weight.

The polymer adhesive mixture comprises seventy percent (70%) by weight of water and thirty percent (30%) by weight of methacrylate copolymer and octylacrylamide. The binder agent comprises octyldimethylamine oxide.

In an exemplary embodiment, the fire surface tension reducer comprises: polyether organosiloxane, from fifteen to thirty-five percent (15-35%) by weight of the surface tension reducing component; and anionic phosphate fluorosurfactant, from point zero one to point one percent (0.01-0.1%) by weight of the surface tension reducing component. The adhesion increaser comprises a sugar surfactant. The anionic surfactant comprises 1,4-Bis(ethylhexyl)sodium sulfosuccinate.

In an exemplary embodiment, the fire mitigation and moderating agent is provided in an aqueous solution. The fire mitigation and moderating agent has a surface tension of between sixteen and twenty dynes per centimeter (16-20 dyn/cm). The fire mitigation and moderating agent has a pH of between 6.5 and 7.5. The fire mitigation and moderating agent is diluted with water, from five to ten times (5×-10×) by weight.

In another exemplary embodiment, a fire mitigating and moderating agent, comprises: potassium hydroxide, from one to five percent (1-5%) by weight; citric acid, from two to seven percent (2-7%) by weight; diammonium phosphate, from four to thirty-six percent (4-36%) by weight; carbamide, from four to twenty percent (4-20%) by weight; and a surface tension reducing component, from point five to four percent (0.5-4%) by weight.

The surface tension reducing component comprises: octyldimethylamine oxide, from twenty to fifty-five percent (20-55%) by weight; polyether organosiloxane, from fifteen to thirty-five percent (15-35%) by weight; anionic phosphate fluorosurfactant, from point zero one to point one percent (0.01-0.1%) by weight; a sugar based surfactant, from five to twenty percent (5-20%) by weight; 1,4-Bis(ethylhexyl)sodium sulfosuccinate, from three to twelve percent (3-12%) by weight; and a polymer adhesive mixture, from point one to two point five percent (0.1-2.5%) by weight, wherein the polymer adhesive mixture comprises seventy percent (70%) by weight of water and thirty percent (30%) by weight of methacrylate copolymer and octylacrylamide.

A method of preventing and extinguishing wild fires comprises the step of applying the exemplary embodiments of the fire mitigation and moderating agent to vegetation and structures. It is also possible to inject the fire mitigation and moderating agent into a flow of propelled liquid.

A process for preventing wild fires, can comprise the steps of: manufacturing the fire mitigating and moderating agent; diluting the fire mitigating and moderating agent with water to form a depositable mixture; and depositing the depositable mixture on vegetation and structures. The depositing step can comprise manually spraying or air dropping the fire mitigating and moderating agent. In exemplary embodiments the fire mitigation and moderating agent is biodegradable and becomes a bio available fertilizer.

Other features and advantages of the present invention will become apparent from the following more detailed description, when taken in conjunction with the accompanying drawings, which illustrate, by way of example, the principles of the invention.

DETAILED DESCRIPTION OF THE PREFERRED EMBODIMENTS

The present invention is an improvement upon existing fire fighting compositions. More specifically, the present invention is an improvement upon U.S. Pat. No. 4,950,410 by Pennartz issued on Aug. 21, 1990, U.S. Pat. No. 4,961,865 by Pennartz issued on Oct. 9, 1990, and U.S. Pat. No. 5,091,097 by Pennartz issued on Feb. 25, 1992. All of these previous patents are incorporated herein in full by this reference.

The present invention is directed to an aqueous film-forming and penetrating liquid for Class A fires. With respect to B and C Class fires, the present invention utilizes a unique combination of salts and minerals that has the effect of reducing high combustion temperatures within a matter of seconds. With respect to trees, brush, and other absorbent materials, the present invention is applied in aqueous solution where it is absorbed into the material fibers. After the water evaporates, the agent remains within the fibers of the material. When a fire occurs, the material will not burn or reduces the flammability of the fibrous material because the minerals and salts absorbed into the fibers melts and releases $CO_2$ that was stored during evaporation. In addition to mitigating and monitoring fires, the agent of the present invention acts as a fertilizer for plant material because the salts and minerals of the present invention may be considered as a bio available 21-53-48 assay fertilizer.

An exemplary composition of the present invention was tested and found to have a "green rating," which means it is environmentally safe and presents no danger to human, animal, or plant life. The exemplary composition was also tested in a laboratory to determine the Flame Spread Index (FSI) and the Smoke Developed Index (SDI). In this test, six 21" by 48" by ½" pieces of A-C Douglas fir plywood were placed in a pressure cylinder, with spaces between each sheet and mechanically restrained to prevent them from floating. The cylinder was closed and the aqueous solution formed in accordance with the present invention was introduced. A 26.5" Hg vacuum was created for one hour, and then 100 psi of pressure was applied for one hour. After this treating cycle was completed, the samples were allowed to drip for a period of time. They were then placed in a circulating air oven and force dried for about 24 hours at 120 degrees Fahrenheit and then air dried for two days. The samples were put back in the oven and dried for an additional four hours at 120 degrees Fahrenheit and then air dried for several more days. The approximate moisture content of the plywood at test time was 7.2 percent (7.2%).

In a thirty minute test, the test samples were exposed to a calibrated flame designed to produce a flame spread along the entire length of red oak flooring in 5.5 minutes. The FSI of this calibrated specimen is currently rated at 91. The SDI value for the red oak specimen remains unchanged at 100. In comparison to the calibration specimens, the specimens treated with the solution formed in accordance with the present invention achieved an FSI of 4.38 and an SDI of 61.92. Because the test was extended from ten minutes to thirty minutes, the treated plywood qualified as a fire retardant and suppressant material.

The mitigation and moderating agent of the present invention enjoys a high degree of success over previous agents. Because it is specially formulated to maximize fire mitigation performance with rapid film cover, deep penetration and extinction, it is particularly suitable where fire mitigation is essential to save lives or prevent major escalation. The surface tension characteristics of the film formed by the present invention, give the film a positive spreading action over the field surface which helps to promote film cover and extinction.

The present invention can be applied with all standard equipment. The high film-forming characteristics and heat transferability makes the present invention suitable for use with hand-held, non-aspiring water spray nozzles. In addition to being very effective, as a rapid intervention medium, in aviation, or other high risk fires where fast fire attack with limited quantities of agent is essential, the present invention has been found to be compatible with and can be applied simultaneously with other foam type agents to the same fire area.

The present invention also enjoys an indefinite storage life when kept in the proper containers. Because of the use of diammonium phosphate, aluminum storage containers should not be used. Bulk storage tanks should be of stainless steel or mild steel with protective epoxy paint. Film-forming properties of the present invention are not affected by freezing and subsequent thaw.

Beneficially, the fire mitigation composition can penetrate and, once dried, preferably also leave a see-through film on the surface of a flammable solid substrate. This results in a fire mitigation composition or residue of the same which does not pose a substantial risk to the health of the applicator of the fire mitigation, nor to the occupant or visitor to the home or other building or area in which the fire mitigation agent is applied. Nor is it known to be harmful to the natural environment.

The fire mitigation composition can be employed in situations in which the aesthetic appearance of a substrate, such as natural woodwork, is desired to remain visible or in which it would be beneficial to retain visual integrity of a substrate material. The preferred liquid fire mitigation composition of the invention can be readily be absorbed by porous materials such as wood, fabric, cardboard, and so forth, where it may remain indefinitely if it is protected from rain and other forms of excess moisture. Advantageously, there is nothing in such a composition known to be substantially harmful to wood per se or to plywood or other glued, or composite wood products.

The fire mitigation composition can be applied to the substrate by any suitable method or known methods used today. For example, as a liquid carrier based formulation, the fire mitigation composition may be applied by spraying, using a hand-held trigger sprayer, pump-up pressure sprayer, or any other type of manual or automatic power-assisted spraying apparatus, including airless sprayers, brushing, dipping, and so forth. Preferably, the fire mitigating composition is applied by spraying to a surface. The fire mitigation composition is applied at a suitable concentration, or rate, to produce a material treated with effective amounts of fire mitigation agent.

An exemplary embodiment of a fire mitigating and moderating agent comprises by weight one percent (1%) to five percent (5%) of a strong base, such as potassium hydroxide or sodium hydroxide, two percent (2%) to seven percent (7%) of a weak acid, such as citric acid, four percent (4%) to thirty-six percent (36%) of a water-soluble ammonium phosphate salt, such as diammonium phosphate, four percent (4%) to twenty percent (20%) of an active hydrogen containing nitrogenous organic compound, such as carbamide, and point five percent (0.5%) to four percent (4%) surface tension reducing component. The surface tension reducing component allows the agent to be applied to dry vegetation and building materials such that it can prevent and inhibit the spread of fires. The agent is colorless, biodegradable, non toxic and non corrosive. When the agent is diluted with rain or other cleaning methods using water, it simply turns into fertilizer and soil conditioner.

The surface tension of the agent is between 20-16 dyne per cm, as compared with a surface tension of 74 dyne for standard water. The lower surface tension allows greater penetration into the materials it is applied to. Furthermore, the agent helps to form a clear and protective coating upon any surface to which it is applied. The pH of the agent in water is neutral, meaning it is between 6.5 to 7.5 pH. The amounts of strong base and weak acid should be adjusted to achieve this neutral state.

The surface tension reducing component comprises by weight twenty percent (20%) to fifty five percent (55%) of a binder agent, such as octyldimethylamine oxide; fifteen percent (15%) to thirty five percent (35%) of a first surface tension reducer, such as modified polyether organosiloxane; five percent (5%) to twenty percent (20%) of an adhesion increaser, such as sugar based surfactant; three percent (3%) to twelve percent (12%) of an anionic surfactant, such as 1,4-Bis(ethylhexyl)sodium sulfosuccinate; point zero one percent (0.01%) to point one percent (0.1%) of a second surface tension reducer, such as anionic phosphate fluorosurfactant; and point one percent (0.1%) to two point five percent (2.5%) polymer adhesive mixture, where the polymer adhesive mixture comprises seventy percent (70%) water and thirty percent (30%) polymer adhesive.

Manufacturing the agent is extremely simple. All of the chemicals can simply be added to together to form the composition. Only the polymer adhesive mixture must be prepared in advance. This is because the polymer adhesive is in the form of a powder and must be dissolved into water first. Therefore a mixture by weight of thirty percent (30%) polymer adhesive and seventy percent (70%) water is premixed, and then that mixture is added to the rest of the chemicals to form the agent.

The polymer adhesive is preferably a combination of methacrylate copolymer and octylacrylamide. The polymer adhesive helps hold the agent to vegetation when it is sprayed or deposited upon dry vegetation. One exemplary embodiment of the polymer adhesive goes by the trade name Amphomer LV-7. The exact ratio of chemicals of Amphomer LV-7 is not disclosed by the manufacturer, but the Applicant has found Amphomer LV-7 is a suitable substitute for the polymer adhesive.

Without the binding agent, the various other chemicals would separate out over time. A suitable binding agent goes by the trade name Surfactant AOA. The surface tension reducer allows the agent to better penetrate into vegetation and building materials. A suitable surface tension reducer goes by the trade name Superwett 20 SE. Between the anionic phosphate fluorosurfactant and the modified polyether organosiloxane, they both work to reduce the overall surface tension of the present invention as discussed above.

The sugar based surfactant increases adhesion of the sugar components of the agent. The sugar based surfactant comprises D-glucopyranose, oligomeric, and decyl octyl glucoside. One exemplary form of the sugar based surfactant goes by the trade name Triton CG 100. The exact ratio of chemicals of Trion CG 100 is not disclosed by the manufacturer, but the Applicant has found Triton CG 100 is a suitable sugar based surfactant.

The invention was based upon the discovery that a clear fire mitigating surface treatment can result from reacting potassium hydroxide and citric acid with diammonium phosphate in a stoichometric ratio sufficient to make an aqueous solution of substantially neutral pH which includes phosphates and a hydroxide in an exothermic reaction. The solution, which is an example of an essentially or substantially neutral ammonium phosphate salt, next is contacted or combined (perhaps reacted) with an active hydrogen-containing nitrogenous organic compound such as carbamide. The fire mitigation and moderation agent of the invention accordingly may be considered, in certain embodiments, to be a substantially if not essentially neutral ammonium phosphate salt in a matrix of a carbamide and a hydroxy-containing carbonific, which forms a surface-coating.

In one embodiment of the present invention, the agent can be mixed in an aqueous solution and applied to an object and/or surrounding landscape whose dry vegetation poses a high fire danger for houses and other constructions, to thereby mitigate and moderate wild-fires. The term fire mitigation and moderating agent, as employed herein, is a composition that, when applied to a flammable material, provides fire protection for the material. In general, this may be done by reducing or perhaps even eliminating the tendency of the material to burn and/or reducing the rate of flame spread along the surface of the material. Preferably, use of the fire mitigation and moderating agent, on a solid material, reduces surface burning characteristics significantly, by at least about 10% to 50%, when compared to untreated material as may be tested by the ASTM E84 Steiner Tunnel Test or similar test.

Without being bound by any theory, the fire retardant composition is believed to operate generally as follows: the fire mitigation composition decomposes under the heat of the fire to produce a nonflammable gas as well as a light weight char, which occurs at a lower temperature than would the item on which it is applied would release flammable gases. The char is formed as the ammonium phosphate breaks down, releasing ammonia gas, which leads to reaction of the phosphate with the carbon-bearing compounds to form a nonflammable ester. As the nitrogen-containing compounds break down to release nonflammable gas, the gas becomes trapped in the carbon mass, forming the char surface. The char surface, by reducing air flow, as well as by reducing or blocking heat transfer to the surface, tends to reduce the burning propensity of the treated surface. As a result, the fire is robbed of fuel and oxygen; therefore generates less heat and less smoke, and may extinguish itself.

Although several embodiments have been described in detail for purposes of illustration, various modifications may be made to each without departing from the scope and spirit of the invention. Accordingly, the invention is not to be limited, except as by the appended claims.

What is claimed is:

1. A fire mitigating and moderating agent, comprising:
- a strong base, from one to five percent (1-5%) by weight;
- a weak acid, from two to seven percent (2-7%) by weight;
- a water soluble ammonium phosphate salt, from four to thirty-six percent (4-36%) by weight;
- an active hydrogen containing nitrogenous organic compound, from four to twenty percent (4-20%) by weight; and
- a surface tension reducing component, from point five to four percent (0.5-4%) by weight, wherein the surface tension reducing component comprises:
  - a binder agent, from twenty to fifty-five percent (20-55%) by weight;
  - a surface tension reducer, from point zero one to thirty-five point one percent (0.01-35.1%) by weight;
  - an adhesion increaser, from five to twenty percent (5-20%) by weight;
  - an anionic surfactant, from three to twelve percent (3-12%) by weight; and
  - a polymer adhesive mixture, from point one to two point five percent (0.1-2.5%) by weight.

2. The fire mitigating and moderating agent of claim 1, wherein the strong base comprises potassium hydroxide and the weak acid comprises citric acid.

3. The fire mitigating and moderating agent of claim 1, wherein the water soluble ammonium phosphate salt comprises diammonium phosphate.

4. The fire mitigating and moderating agent of claim 1, wherein the hydrogen containing nitrogenous organic compound comprises carbamide.

5. The fire mitigating and moderating agent of claim 1, wherein the polymer adhesive mixture comprises seventy percent (70%) by weight of water and thirty percent (30%) by weight of methacrylate copolymer and octylacrylamide.

6. The fire mitigating and moderating agent of claim 1, wherein the binder agent comprises octyldimethylamine oxide.

7. The fire mitigating and moderating agent of claim 1, wherein the surface tension reducer comprises:
polyether organosiloxane, from fifteen to thirty-five percent (15-35%) by weight of the surface tension reducing component; and
anionic phosphate fluorosurfactant, from point zero one to point one percent (0.01-0.1%) by weight of the surface tension reducing component.

8. The fire mitigating and moderating agent of claim 1, wherein the adhesion increaser comprises a sugar based surfactant.

9. The fire mitigating and moderating agent of claim 1, wherein the anionic surfactant comprises 1,4-Bis(ethylhexyl) sodium sulfosuccinate.

10. The fire mitigating and moderating agent of claim 1, wherein the fire mitigation and moderating agent is provided in an aqueous solution.

11. The fire mitigating and moderating agent of claim 1, wherein the fire mitigation and moderating agent has a surface tension of between sixteen and twenty dynes per centimeter (16-20 dyn/cm).

12. The fire mitigating and moderating agent of claim 1, wherein the fire mitigation and moderating agent has a pH of between 6.5 and 7.5.

13. The fire mitigating and moderating agent of claim 1, wherein the fire mitigation and moderating agent is diluted with water, from five to ten times (5×-10×) by weight.

14. A fire mitigating and moderating agent, comprising:
potassium hydroxide, from one to five percent (1-5%) by weight;
citric acid, from two to seven percent (2-7%) by weight;
diammonium phosphate, from four to thirty-six percent (4-36%) by weight;
carbamide, from four to twenty percent (4-20%) by weight; and
a surface tension reducing component, from point five to four percent (0.5-4%) by weight, wherein the surface tension reducing component comprises:
octyldimethylamine oxide, from twenty to fifty-five percent (20-55%) by weight;
polyether organosiloxane, from fifteen to thirty-five percent (15-35%) by weight;
anionic phosphate fluorosurfactant, from point zero one to point one percent (0.01-0.1%) by weight;
a sugar based surfactant, from five to twenty percent (5-20%) by weight;
1,4-Bis(ethylhexyl)sodium sulfosuccinate, from three to twelve percent (3-12%) by weight; and
a polymer adhesive mixture, from point one to two point five percent (0.1-2.5%) by weight, wherein the polymer adhesive mixture comprises seventy percent (70%) by weight of water and thirty percent (30%) by weight of methacrylate copolymer and octylacrylamide.

15. A method of preventing and extinguishing wild fires comprising the step of applying the fire mitigation and moderating agent of claim 1 to dry combustible vegetation and structures.

16. The method of claim 15, further comprising the step of injecting the fire mitigation and moderating agent into a flow of propelled liquid.

17. A process for preventing wild fires, comprising the steps of:
manufacturing the fire mitigating and moderating agent of claim 1;
diluting the fire mitigating and moderating agent with water to form a depositable mixture; and
depositing the depositable mixture on dry combustible vegetation and structures.

18. The process of claim 17, wherein the depositing step comprises manually spraying or air dropping the fire mitigating and moderating agent.

19. The process of claim 17, wherein the fire mitigation and moderating agent is biodegradable.

20. The process of claim 19, wherein the fire mitigation and moderating agent becomes a bio available fertilizer.

* * * * *